(12) United States Patent
Shkolnikov et al.

(10) Patent No.: US 10,670,459 B2
(45) Date of Patent: Jun. 2, 2020

(54) SURFACE ENHANCED RAMAN SPECTROSCOPY SAMPLE CARRIER

(71) Applicant: Hewlett-Packard Development Company, L.P., Houston, TX (US)

(72) Inventors: Viktor Shkolnikov, Palo Alto, CA (US); Anita Rogacs, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/770,466

(22) PCT Filed: Feb. 29, 2016

(86) PCT No.: PCT/US2016/020122
§ 371 (c)(1),
(2) Date: Apr. 23, 2018

(87) PCT Pub. No.: WO2017/151102
PCT Pub. Date: Sep. 8, 2017

(65) Prior Publication Data
US 2018/0348057 A1 Dec. 6, 2018

(51) Int. Cl.
*G01J 3/44* (2006.01)
*G01J 3/02* (2006.01)
(Continued)

(52) U.S. Cl.
CPC .............. *G01J 3/44* (2013.01); *G01J 3/021* (2013.01); *G01J 3/0205* (2013.01);
(Continued)

(58) Field of Classification Search
CPC ......... G01J 3/44; G01N 21/65; G01N 21/658; G01N 21/11; G01N 21/253
See application file for complete search history.

(56) References Cited

U.S. PATENT DOCUMENTS 6,331,274 B1 * 12/2001 Ackley ................. B01L 3/5027
257/E21.43
7,342,656 B2 * 3/2008 Islam ................... G01N 21/658
356/301
(Continued)

FOREIGN PATENT DOCUMENTS

CN 101936906 A 1/2011
WO WO-2009020479 A2 2/2009
(Continued)

OTHER PUBLICATIONS

International Search Report and Written Opinion dated Oct. 12, 2016, PCT Patent Application No. PCT/US2016/020122, filed Feb. 29, 2016, Korean Intellectual Property Office.
(Continued)

*Primary Examiner* — Violeta A Prieto
(74) *Attorney, Agent, or Firm* — Rathe Lindenbaum LLP

(57) ABSTRACT

An apparatus includes a sample carrier having wells. Each of the wells has sides and a floor forming an interior. A surface enhanced Raman spectroscopy (SERS) structure is within the interior of each of the wells. A pneumatic port is connected to the interior of each of the wells. A pneumatic passage is connected to the pneumatic ports.

14 Claims, 6 Drawing Sheets

(51) Int. Cl.
*G01N 21/65* (2006.01)
*G01N 35/04* (2006.01)
*G01N 21/11* (2006.01)
*G01N 35/00* (2006.01)
*G01N 21/25* (2006.01)

(52) U.S. Cl.
CPC ............ *G01J 3/0208* (2013.01); *G01J 3/0259* (2013.01); *G01N 21/65* (2013.01); *G01N 21/658* (2013.01); *G01N 35/00* (2013.01); *G01N 35/04* (2013.01); *G01N 21/11* (2013.01); *G01N 21/253* (2013.01); *G01N 35/0099* (2013.01); *G01N 2021/651* (2013.01); *G01N 2035/00356* (2013.01); *G01N 2035/0437* (2013.01); *G01N 2201/0446* (2013.01)

(56) References Cited

U.S. PATENT DOCUMENTS

| | | | |
|---|---|---|---|
| 8,107,070 | B2 | 1/2012 | Zhao et al. |
| 8,414,830 | B2 | 4/2013 | Jiang |
| 8,697,434 | B2 | 4/2014 | Voorhees |
| 2002/0151041 | A1 | 10/2002 | Kreimer et al. |
| 2003/0059820 | A1 | 3/2003 | Vo-Dinh |
| 2006/0061762 | A1 | 3/2006 | Dwight et al. |
| 2008/0024776 | A1 | 1/2008 | Bratkovski et al. |
| 2010/0291599 | A1 | 11/2010 | Tague et al. |
| 2011/0294691 | A1* | 12/2011 | Erickson ............ B01F 13/0076 506/9 |
| 2013/0278928 | A1 | 10/2013 | Mourey et al. |
| 2014/0234873 | A1 | 8/2014 | Leck et al. |
| 2014/0323330 | A1 | 10/2014 | Bergo |
| 2017/0234799 | A1* | 8/2017 | Marks ............... B01L 3/502753 356/301 |
| 2017/0242234 | A1* | 8/2017 | Ashcroft ............ G01N 15/1436 |
| 2018/0143139 | A1* | 5/2018 | Simske ................. G01N 21/03 |
| 2018/0348106 | A1* | 12/2018 | Shkolnikov .......... G01N 1/4044 |
| 2019/0076839 | A1* | 3/2019 | Shkolnikov .......... B01L 3/5025 |

FOREIGN PATENT DOCUMENTS

| | | | |
|---|---|---|---|
| WO | WO-2010033267 | A2 | 3/2010 |
| WO | WO-2012161683 | A1 | 11/2012 |

OTHER PUBLICATIONS

Moonkwon Lee et al., "SERS-based Immunoassay Using a Gold Array-embedded Gradient Microfluidic Chip", Jun. 11, 2012, 5 pages. http://pubs.rsc.org/en/content/articlelanding/2012/lc/c2lc40353f/unauth#!divAbstract.

* cited by examiner

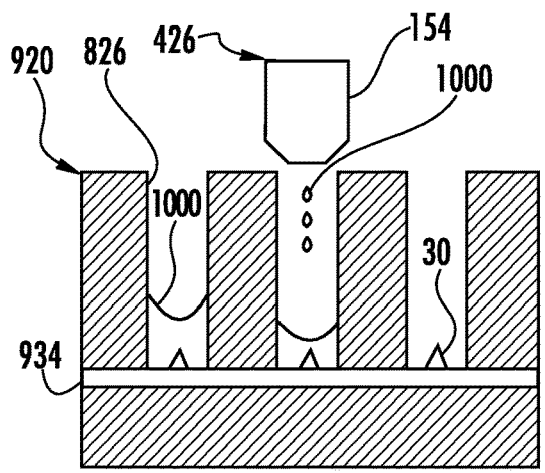
FIG. 11 DISPENSE ANALYTE AND INCUBATE
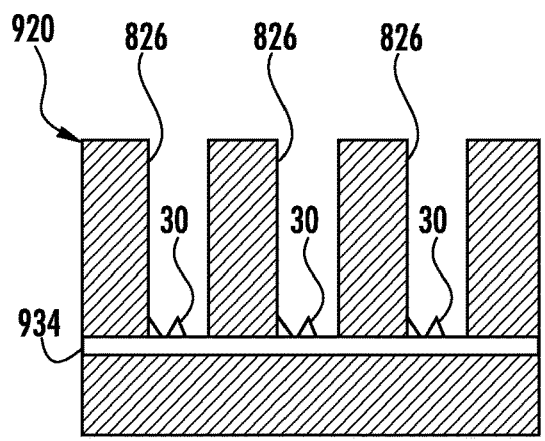
FIG. 12 VACUUM ANALYTE SOLUTION
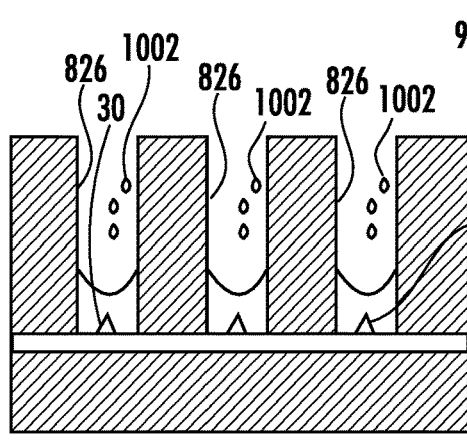
FIG. 13 DISPENSE RINSING SOLVENT AND CLOSE NANOFINGERS
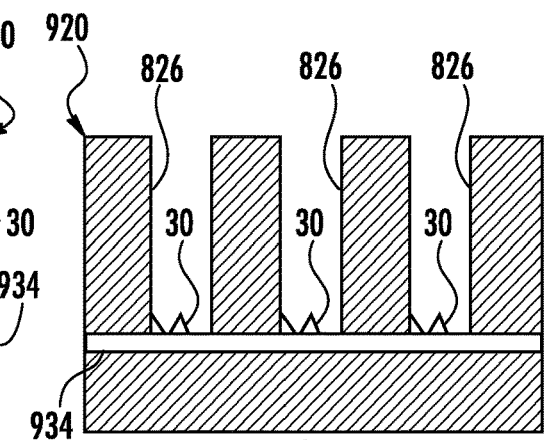
FIG. 14 VACUUM RINSING SOLVENT
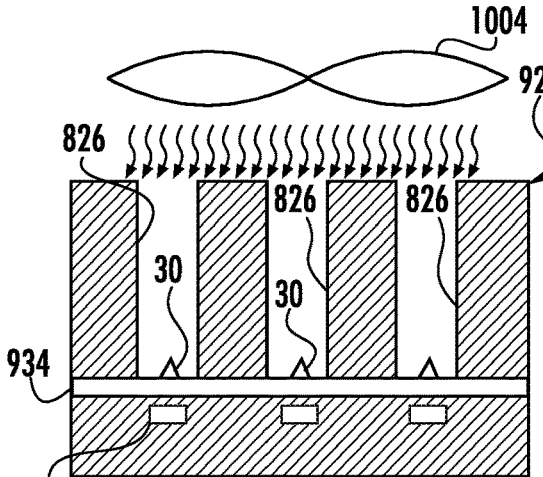
FIG. 15 INERT GAS AND HEATER DRY SERS SUBSTRATE
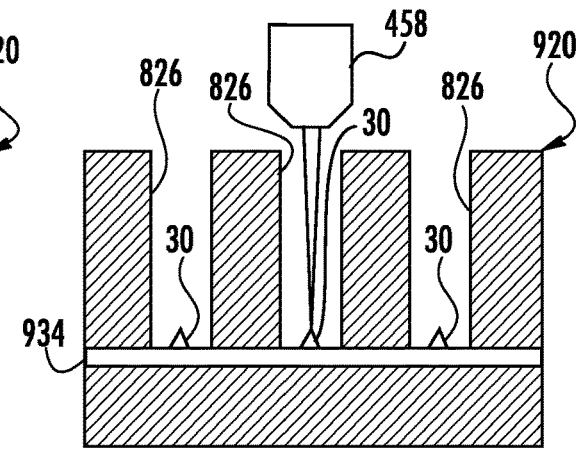
FIG. 16 OBTAIN SERS SPECTRA

SURFACE ENHANCED RAMAN SPECTROSCOPY SAMPLE CARRIER

CLAIM FOR PRIORITY

The present application is a national stage filing under 35 U.S.C. § 371 of PCT application number PCT/US2016/020122, having an international filing date of Feb. 29, 2016, the disclosure of which is hereby incorporated by reference in its entirety.

BACKGROUND

Surface enhanced RAMAN spectroscopy (SERS) is sometimes used for analyzing the structure of inorganic materials and complex organic molecules. SERS focuses electromagnetic radiation or light onto an analyte or solution containing an analyte, wherein the interaction between the light and the analyte is detected for analysis.

BRIEF DESCRIPTION OF THE DRAWINGS

FIGS. 11-16 are sectional views of an example sample preparation and sensing method carried out with a portion of the sample carrier of FIG. 10 with the system of FIG. 10.

DETAILED DESCRIPTION OF EXAMPLES

Figure 1:
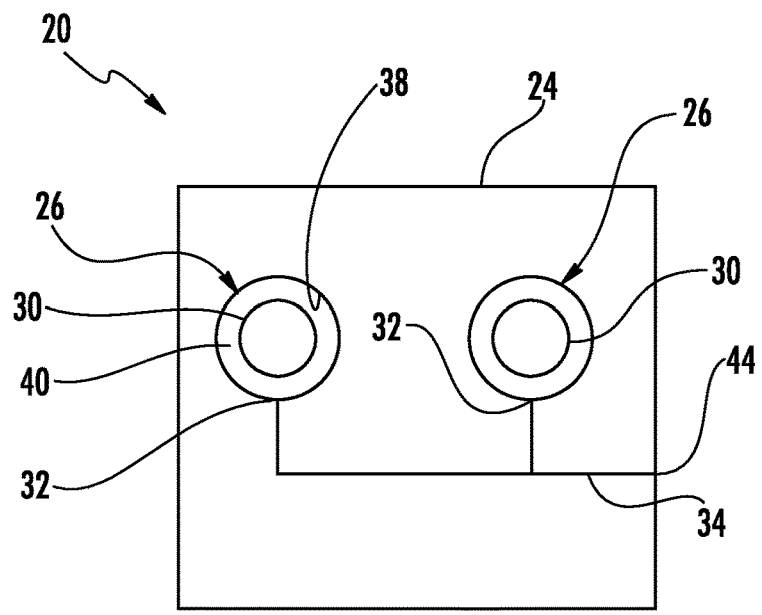
FIG. 1 is a schematic diagram of an example SERS sample carrier.

FIG. 1 schematically illustrates an example surface enhanced RAMAN spectroscopy (SERS) sample carrier 20. As will be described hereafter, sample carrier 20 facilitates SERS analysis in parallel on a large number of different analyte solutions. Sample carrier 20 comprises manifold 24, wells 26, SERS structures 30, pneumatic ports 32 and pneumatic passage 34.

Manifold 24 serves as a platform for supporting the remaining components of carrier 20. In one implementation, manifold 24 comprises a substantially flat planar structure in which wells 26 and pneumatic passage 34 are formed. In one implementation, manifold 24 is molded from a polymer such as polystyrene, polypropylene, polyethylene, polycarbonate, polyvinyl chloride. In yet another implementation, manifold 24 is formed from a silicon or silicon-based material. In still other implementations, manifold 24 may be formed from other materials in other manners.

Wells 26 comprise cavities or recesses formed in an upper surface of manifold 24. Each of wells 26 has sides 38 and a floor 40. In one implementation, each of wells 26 has a volume of between 100 μl and 1 ml. In one implementation, each of wells 26 has a diameter of between 1 mm and 1 cm and a depth of between 1 mm and 1 cm. In other implementations, each of wells 26 may have other volumes and other cross-sectional areas and depths.

Although wells 26 are each illustrated as being cylindrical in shape, in other implementations, wells 26 may have other cross-sectional shapes, such as oval, square, rectangular or other polygonal cross-sectional shapes. Although carrier 20 is illustrated as comprising two wells, in other implementations, carrier 20 may comprise additional wells, such as a grid or two dimensional array of spaced wells 26.

SERS structures 30 (schematically illustrated) comprise structures that may include a metal surface or structure, wherein interactions between the analyte and the metal surface cause an increase in the intensity of the Raman-scattered radiation. Such metal surfaces may include a roughened metal surface, such as periodic gratings. In another implementation, such metal surfaces may comprise assembled nanoparticles. In some implementations, such metal surfaces may comprise metal islands. In one implementation, such metal islands comprise flexible columnar supports such as pillars, needles, fingers, particles or wires. In some implementations, the flexible columnar structures may include a metal cap or head upon which an analyte may be deposited. In some implementations, such columnar structures are formed from materials and/or are dimensioned so as to bend or flex towards and away from one another in response to applied electric fields. In some implementations, the SERS structures are movable and are self-actuating, wherein such columnar structures bend or flex towards one another in response to micro-capillary forces so as to self-organize, wherein such bending facilitates close spacing between the structures for greater scattered radiation intensity.

In some implementations, the columnar structures are electrically conductive such that the columnar structures and/or their metal caps or heads provide distinct charging points intensifying the generated electric field at distinct points to enhance attraction of the charged ions of the analyte to the columnar structures of structure 30. For example, in some implementations, the columnar structures are formed from an electrically conductive polymer such as Poly(3,4-ethylenedioxythiophene) or PEDOT (or sometimes PEDT), a conducting polymer based on 3,4-ethylenedioxythiophene or EDOT monomer. In one implementation, the SERS structures have a nanometer scale to facilitate nano-enhanced Raman spectroscopy (NERS). Such nano-scale NERS structures may increase the intensity of radiation scattered by the analyte adsorbed on such structures by a factor as high as $10^{16}$. In yet other implementations, such columnar structures may be formed from non-electrically conductive materials, such as non-electrically conductive polymers, or may be formed from metal materials, such as wire filaments or the like.

Pneumatic ports 32 comprise openings in or along the sides of each of wells 26 through which liquid may be withdrawn from the interior of each of wells 26. In the example illustrated, pneumatic ports 32 are located at or adjacent the floor of each of wells 26 to facilitate more complete removal of liquid from wells 26. In one implementation, each of pneumatic ports 32 is spaced no greater than 1 mm from the floor of each of wells 26. Pneumatic ports 32 are each connected to pneumatic passage 34.

Pneumatic passage 34 comprises a liquid flow passage in connection with each of the multiple pneumatic ports 32 of carrier 20. Pneumatic passage 32 extends within and through manifold 24 to an exterior port 44 at which pneumatic passage 34 may be connected to a pneumatic pump which may serve as a pneumatic source for applying a vacuum to the passage 34 into the interior of each of wells 26 so as to withdraw liquid within each of wells 26 through passage 34.

Figure 2:
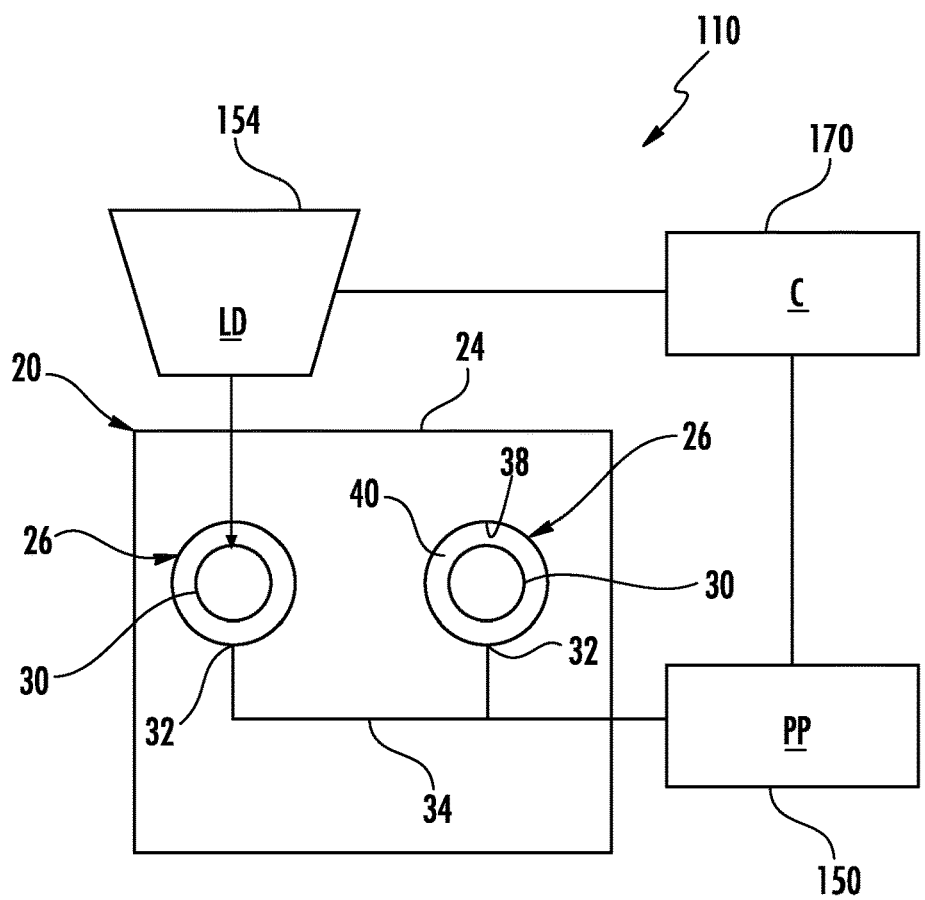
FIG. 2 is a schematic diagram of an example SERS sample preparation system including the example SERS sample carrier of FIG. 1.

FIG. 2 schematically illustrates sample carrier 20 utilized as part of an overall sample preparation system 110. System 110 utilizes carrier 20 in preparing multiple analyte samples in parallel. In the example illustrated, carrier 20 is releasably or removably connected to the remaining components of system 110 so as to serve as a replaceable or interchangeable consumable or modular component for system 110. For purposes of this disclosure, the term "releasably" or "removably" with respect to an attachment or coupling of two structures means that the two structures may be repeatedly connected and disconnected to and from one another without material damage to either of the two structures or their functioning.

As shown by FIG. 2, in addition to sample carrier 20, system 110 comprises pneumatic pump (PP) 150, liquid dispenser (LD) 154 and controller (C) 170. Pneumatic pump 150 comprises a device to be releasably connected to exterior port 44 so as to pressurize a gas, such as air, within liquid passage 34. In one implementation, pneumatic pump 150 is controllable by controller 170 to selectively apply a positive pressure or a negative pressure to passage 34. In other implementations, pneumatic pump 150 applies a negative pressure so as to serve as a vacuum source for pneumatic passage 34.

Liquid dispenser 154 comprises a device to selectively dispense samples of analyte through an upper mouth or opening of each of wells 26 into each of wells 26. In some implementations, liquid dispenser 154 comprises a device that may additionally selectively dispense other liquids or solutions through the upper mouth or opening of each of wells 26 into wells 26. Examples of other liquids or solutions that may be additionally dispensed into each of well 26 include, but are not limited to, other sample preparation agents or rinsing liquids. In one implementation, liquid dispenser 154 comprises a robotic liquid dispensing device under the control of controller 170.

Controller 170 comprises electronics that control the operation of pneumatic pump 150 and liquid dispenser 154. In one implementation, controller 170 comprises a processing unit that outputs control signals directing the operation of pneumatic pump 150 and liquid dispenser 154. For purposes of this application, the term "processing unit" shall mean hardware that executes sequences of instructions contained in a memory. Execution of the sequences of instructions causes the processing unit to perform steps such as generating control signals. The instructions may be loaded in a non-transitory memory such as a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 170 may be embodied as part of one or more application-specific integrated circuits (ASICs). Unless otherwise specifically noted, the controller is not limited to any specific combination of hardware circuitry and software, nor to any particular source for the instructions executed by the processing unit.

Figure 3:
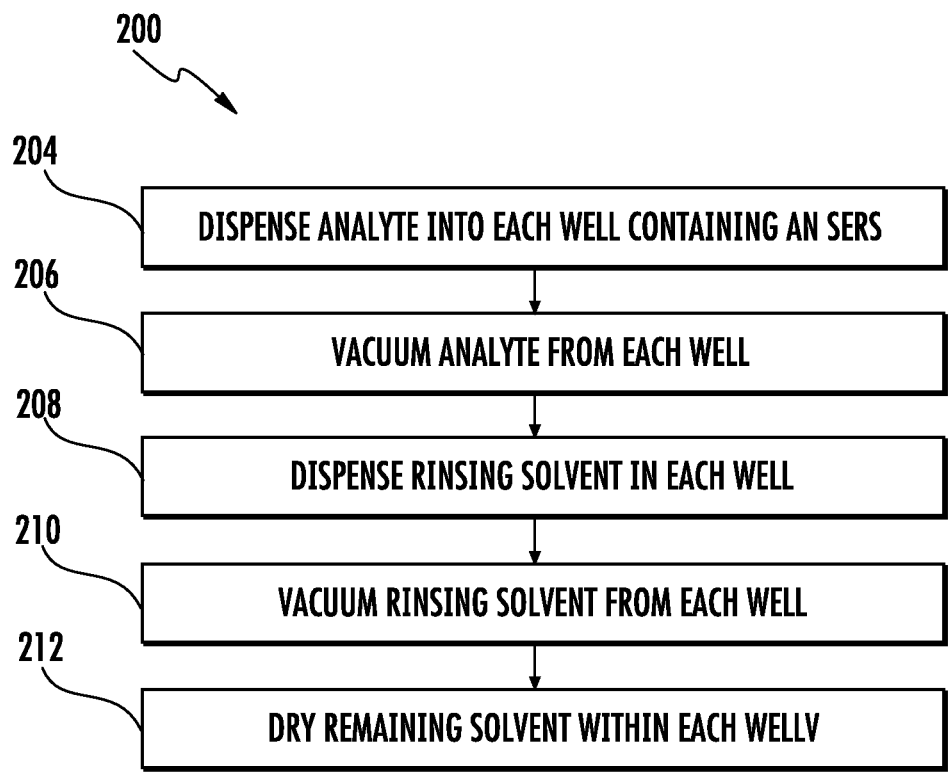
FIG. 3 is a flow diagram of an example SERS sample preparation method.

Controller 170 outputs control signals to prepare samples for analysis by an SERS sensor. FIG. 3 is a flow diagram illustrating one example method 200 that may be carried out by system 110 to prepare samples for SERS analysis. As indicated by block 204, controller 170 outputs control signals causing analyte to be dispensed into each well 26 containing an SERS structure 30. The analyte deposited within each of wells 26 may comprise the same analyte or may comprise different analytes.

To facilitate incubation of the analyte on the SERS, controller 170 outputs control signals closing ports 32 of each of wells 26 so as to inhibit or prevent the dispensed analyte from leaving wells 26. In one implementation, controller 170 outputs control signals causing pneumatic pump 150 to apply a positive pressure to pneumatic passage 34 such that liquid within wells 26 is inhibited from entering passage 34 through ports 32. In yet another implementation, carrier 20 may additionally comprise valves for selectively opening and closing each of ports 32, wherein controller 170 outputs control signals closing each of the valves for each of the ports 32.

As indicated by block 206, after incubation of the analyte for a predefined period of time, controller 170 opens ports 32 and activates pneumatic pump 150 to vacuum and withdraw the analyte solution from each of the wells 26. In implementations where carrier 20 comprises valves for each of ports 32, controller 170 outputs control signals opening such valves prior to the withdrawal of the analyte solution from each of wells 26.

As indicated by block 208, after the analyte solution has been withdrawn from each of wells 26, controller 170 may output control signals directing liquid dispenser 154 (or a different liquid dispenser) to dispense a rinsing liquid or solvent, such as ethanol (EtOH), into each of wells 26. In one implementation where SERS structure 32 comprise nano fingers, the application of the rinsing solvent may cause the nano fingers to close. During such dispensing, port 32 may be open, whereby the rinsing solvent is continuously withdrawn from well 26, or may be temporarily closed during the filling of the well 26 with rinsing solvent and subsequently opened for the withdrawal of the rinsing solvent from each well 26. As indicated by block 210, controller 150 may output control signals causing pneumatic pump 150 to apply a vacuum to passage 34 to assist in the removal of rinsing solvent from each well 26.

As indicated by block 212, once the SERS structures 32 have been rinsed and the rinsing solvent has been removed through ports 32 and passage 34, any remaining solvent on the SERS structure 30 is evaporated or dried. As will be described hereafter, in some implementations, carrier 20 may comprise embedded heaters which are activated by controller 170 to accelerate such evaporation or drying. In some implementations, controller 170 may additionally or alternatively output control signals causing a source of a gas, such as nitrogen, argon or clean-air, to be directed into wells 26 from above wells 26 to increase gas flow and exchange to further accelerate evaporation. In some implementations, controller 170 may output control signals causing pneumatic pump 150 to pump air or other gas through passage 34 into each of wells 26 to increase gas flow and exchange to further accelerate evaporation. Upon evaporation of the rinsing solvent, the remaining sample within each of wells 26 is ready for being sensed by an SERS sensor.

Figure 4:
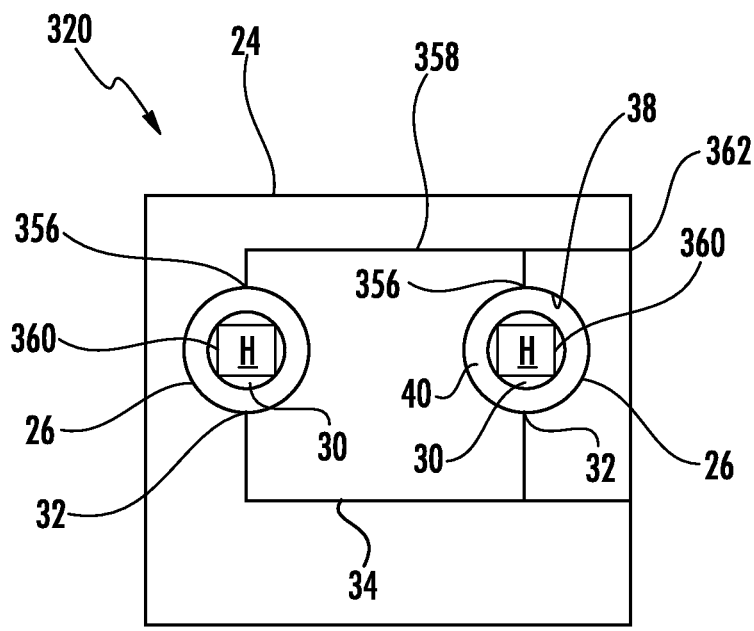
FIG. 4 is a schematic diagram of example SERS sample carrier.

FIG. 4 schematically illustrates sample carrier 320, an example implementation of sample carrier 20. Sample carrier 320 is similar to sample carrier 20 except that sample carrier 320 additionally comprises delivery ports 356, delivery passage 358 and heaters 360. Those remaining elements or components of carrier 320 which correspond to elements or components of carrier 20 are numbered similarly.

Delivery ports 356 comprise openings in or along the sides of each of wells 26 through which liquid may be dispensed or delivered into the interior of each of wells 26. In the example illustrated, delivery ports 356 are located above a top of SERS structure 30 such that SERS structure 30 may be submersed within liquid dispensed through delivery ports 356. In one implementation, each delivery port 356 is located at or adjacent the mouth or top of each of wells 26. In one implementation, each of delivery ports 356 is spaced at least 1 mm above a top of SERS structure 30. Delivery ports 356 are each connected to delivery passage 358.

Delivery passage 358 comprises a liquid flow passage in connection with each of the multiple delivery ports 356 of carrier 20. Delivery passage 358 extends within and through manifold 24 to an exterior inlet port 362 at which delivery passage 358 may be connected to a liquid supply which may serve to selectively supply a liquid, such as an analyte and/or a rinsing solvent to the passage 358 and into the interior of each of wells 26 so as to supply each of wells 26 with the analyte and/or rinsing solvent through passage 358. In some implementations, ports 356 and passage 358 may be omitted.

Heaters 360 comprise devices that emit heat so as to heat the interior wells 26 to facilitate drying of any remaining solvent within each well 26. In one implementation, heaters 360 comprise electrically conductive resistors embedded below floor 40 of each of wells 26. In another implementation, heaters 360 comprise electrically conductive resistors embedded within the material extending about sides 38 of each of wells 26. In yet other implementations, heaters 360 comprise ports or conduits opening through sides 38 of wells 26 and through which warm gas or air is dispensed to facilitate drying of any remaining solvent within each well 26. In yet other implementations, heaters 360 may be omitted.

Figure 5:
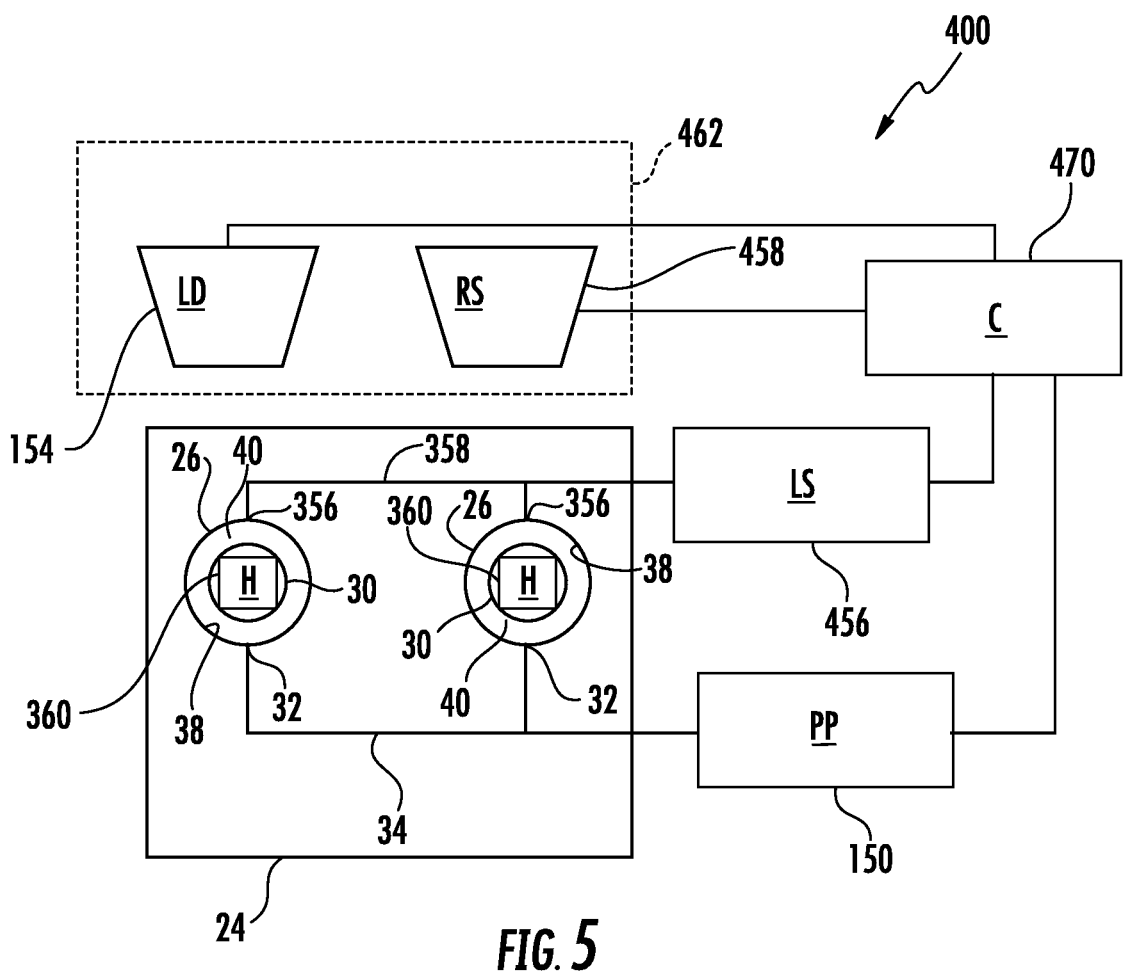
FIG. 5 is a schematic diagram of an example SERS sample preparation and sensing system including the example SERS sample carrier of FIG. 4.

FIG. 5 schematically illustrates sample carrier 320 utilized as part of an overall sample preparation and sensing system 400. System 400 utilizes carrier 320 in preparing multiple analyte samples in parallel. In the example illustrated, carrier 320 is releasably or removably connected to the remaining components of system 400 so as to serve as a replaceable or interchangeable consumable or modular component for system 400. As shown by FIG. 5, in addition to sample carrier 320, system 400 comprises pneumatic pump (PP) 150 (described above), liquid dispenser (LD) 154 (described above), liquid supply 456, Raman spectroscopy sensor 458 and controller (C) 470. Those components of system 400 which correspond to components of system 110 are numbered similarly.

Liquid supply 456 comprises a source of a liquid for use in preparing the sample and/or the SERS sensor. In the example illustrated, liquid supply 456 comprises a source of a liquid rinsing solvent for preparing the SERS structure 30 for sensing by the Raman spectroscopy sensor 458. In one implementation, liquid supply 456 further comprises a pump to supply the liquid under pressure into passage 358 when carrier 320 is connected into system 400 and in response to signals from controller 470.

Raman spectroscopy sensor (RS) 458 comprises a device that directs light, such as a laser beam of light, towards and onto SERS structure 30 of each of the wells 26 of carrier 320, and a device that focuses, gathers and detects and SERS spectra resulting from light scattering by the sample analyte on SERS structure 30. In one implementation, sensor 458 comprises an infrared laser to emit a beam having a wavelength of 785 nm onto SERS structure 30 of each of wells 26. To direct the beam of light and focus the SERS spectra, resulting from scattering of the light by the SERS structure 30, onto a sensing panel, sensor 458 may include one or more optical components such as lenses and mirrors. The received SERS spectra is compared against previous identified spectrum fingerprints or signatures to identify characteristics of the sample analyte.

In one implementation, Raman spectroscopy sensor 458 may be supported and moved by a robot that selectively positions sensor 458 with respect to each of wells 26 of carrier 20 in response to control signals from controller 470. As indicated by broken lines, in one implementation, sensor 458 may be supported and moved by a robot 462, such as a cartesian robot, that additionally moves and positions liquid dispenser 154 in response to control signals from controller 470. In yet other implementations, liquid dispenser 154 and sensor 458 may be moved and positioned by separate and independent robots.

Controller 470 is similar to controller 170 described above except that controller 470 is to additionally control the operation of liquid supply 456, heaters 360 and sensor 458. Controller 470 comprises electronic hardware, such as a processing unit, to carry out instructions contained in a non-transitory computer-readable medium or memory. In one implementation, controller 470 carries out method 200 and additionally outputs control signals to direct robot 462 to sequentially position sensor 458 opposite to each of wells 26 so as to obtain and sense SERS spectra from the SERS structure 30 within each well 26.

In the example illustrated, when carrying out method 200, controller 470 outputs control signals causing robot 462 to position liquid dispenser 154 opposite to each of wells 26 of carrier 20. When positioned opposite to a particular well 26, controller 470 outputs control signals to liquid dispenser 154 to dispense a predetermined sample of analyte into the well 26. Prior to dispensing of the sample analyte into each well, controller 470 additionally outputs control signals causing pneumatic pump 150 to create a positive pressure in passage 34 to inhibit the sample analyte being deposited from exiting well 26 and entering passage 34. Alternatively, in other implementations, controller 470 may help control signals to close ports 32 with an associated valve.

Thereafter, controller 470 carries out the steps indicated in block 206-212 described above. As indicated by block 206, controller 470 directs pneumatic pump 150 to vacuum analyte from each well 26 through passage 34. As indicated by block 208, controller 470 outputs control signals directing liquid source 456 to dispense a rinsing solvent into each of wells 26 through ports 356 and through passage 358. In one implementation, the rinsing solvent is permitted to collect within each of wells 26 to rise to a level above the top of SERS structure 30, submerging SERS structure 30 within each well 26. Thereafter, as indicated by block 210, controller 470 outputs control signals causing pneumatic pump 150 to vacuum the rinsing solvent from each well 26 through ports 32 and passage 34.

As indicated by block 212, controller 470 outputs control signals causing heaters 360 to emit heat to accelerate drying of any remaining rinsing solvent upon SERS structure 30 within each of wells 26. In one implementation, controller 470 additionally directs pneumatic pump 150 to pump air or other gas, heated or unheated, through passage 34 to further accelerate drying. In some implementations, controller 470 may additionally or alternatively output control signals to an overhead blower fan which directs air into each of wells 26, from above each of wells 26, to accelerate drying. In yet other implementations, the remaining solvent within each well is permitted to dry without any assistance, naturally evaporating.

Once the previously dispensed rinsing solvent has sufficiently evaporated within each of wells 26, the sample analyte residing on SERS structure 30 is ready for analysis. Controller 470 outputs control signals causing robot 462 to sequentially position Raman sensor 458 opposite to each of wells 26. When positioned opposite to the SERS structure 30 of each of well 26, controller 470 activates sensor 458 to direct a beam of light, such as infrared light, onto the SERS structure 30 and to gather or collect SERS spectra from the SERS structure 30 within each well 26. Controller 470 may then analyze the receipt spectra against predetermined spectra signatures or fingerprints to identify characteristics of the sample analyte within each of wells 26.

Figure 6:
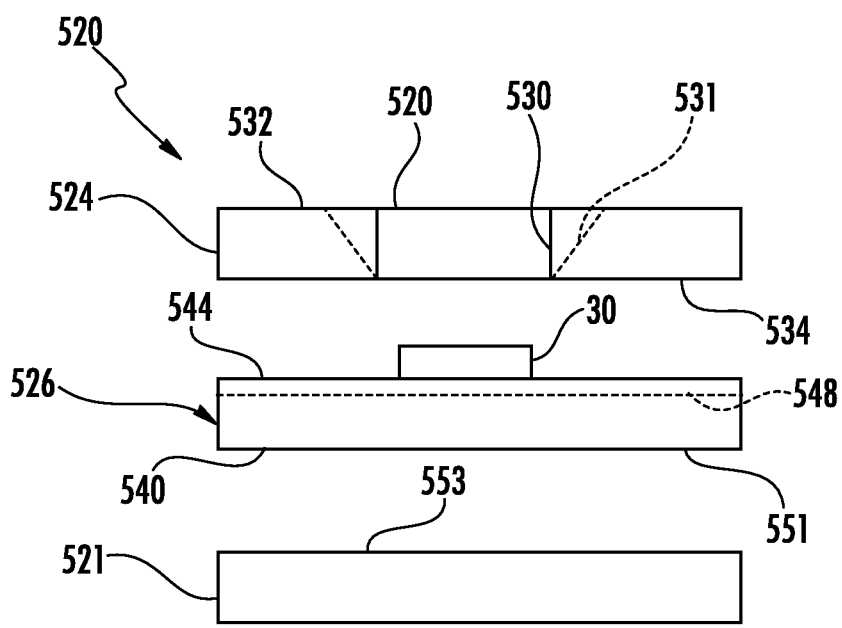
FIG. 6 is an exploded schematic diagram of an example SERS sample carrier.
Figure 7:
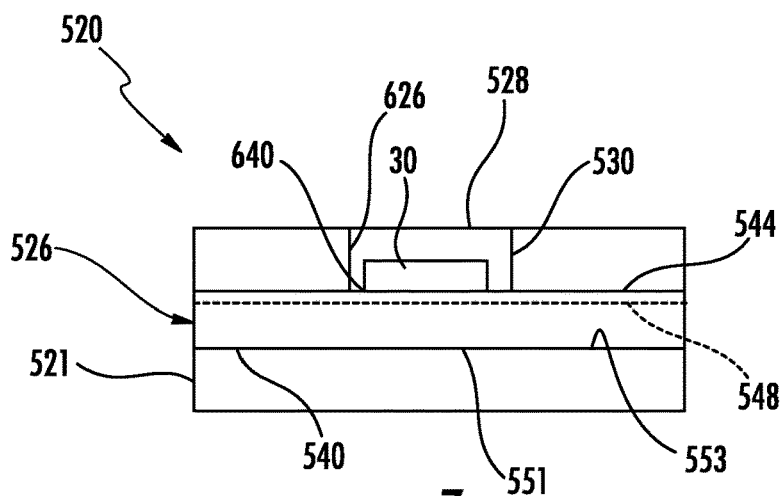
FIG. 7 is a schematic diagram of the SERS sample carrier of FIG. 6.

FIGS. 6 and 7 schematically illustrate an example SERS sample carrier 520 that may be used when analyzing a sample analyte using surface enhanced Raman spectroscopy. FIG. 6 is an exploded sectional view of sample carrier 520 while FIG. 7 illustrates the assembled sample carrier 520. Carrier 520 comprises bottom support 522, well plate 524, and SERS sheet 526. Bottom support 522 comprises a panel which serves as a substrate for carrier 520. In the example illustrated, bottom support 522 serves as a platform or backbone for supporting and rigidifying SERS sheet 526 to inhibit unintended bending or flexing of SERS sheet 526. In one implementation, support 522 is formed from a polymer material. In other implementations, support 522 is formed from a silicone-based material. In yet other implementations, support 522 may be formed from other materials.

Well plate 524 comprises a plate or sheet having a bore 528 extending completely through plate 524, from the top surface to the bottom surface. Bore 528 has interior sides 530 serve as sides of the subsequently formed well of carrier 520. In one implementation, bore 528 is cylindrical. In another implementation, bore 528 may have other cross sectional shape such as square, rectangular, oval or polygonal. In the example illustrated, bore 528 has a constant or uniform cross-sectional area, wherein the area of the top of well 528 along the top surface of plate 524 is the same as the area of the bottom of wells 528 along the bottom surface of plate 524. In other implementations, the area of bore 528 may vary as it extends through plate 524. For example, as illustrated by broken lines 531, bore 528 may be wider at the top surface 532 of plate 524 than at bottom surface 534 of plate 524 (as indicated by broken lines). In such an implementation, bore 528 is funnel-shaped, facilitating the dispensing of liquid and/or overhead drying of liquid within the separately formed well.

SERS sheet 526 comprises substrate 540 and SERS structure 30 (described above). Substrate 540 supports SERS structure 30 on its upper surface 544. SERS structure 30 comprises an island rising upwardly from upper surface 544 of substrate 540 at a location in alignment with bore 528. In one implementation, substrate 526 of SERS sheet 526 comprises a flexible sheet, facilitating fabrication of SERS sheet 526 formed SERS structure 30 with a roll-to-roll process. In some implementations, sheet 526 may be formed from a substantially inflexible or rigid material such as a rigid panel of silicon, a rigid polymer or other materials. In implementations where substrate 526 is sufficiently rigid to inhibit bending or flexing when being handled, bottom support 521 may be omitted.

As shown by FIG. 7, when bottom support 521, well support 524 and SERS sheet 526 are assembled, sheet 526 is sandwiched between bottom support 521 and well plate 524 with upper surface 544 fixedly secured to surface 534 of well plate 524 and with lower surface 551 of SERS sheet 526 fixedly secured to upper surface 553 of bottom support 521. The securement of SERS sheet 526 to bottom support 521 and well plate 524 may be provided by adhesives, welds, bonds, fasteners or other connection technologies. Well support 524 and SERS sheet 526 cooperate to form a well 626, wherein sides 530 of bore 528 form the sides of wells 626 and wherein those portions of upper surface 544 of SERS sheet 526 about bore 28 form the floor 640 of wells 626. As further shown by FIG. 7, the island of SERS structure 30 projects into and is received within bore 528 so as to extend along the bottom of each well 626.

Portions of bottom surface 534 of well plate 524 about bore 528 are sealed against opposing portions of upper surface 544 of SCR plate 526. As indicated by broken lines, in one implementation, the upper surface 544 of SERS plate 526 comprises a sealing structure 548 to provide a liquid tight seal between abutting portions of plate 524 and sheet 526 about well 626. In one implementation, the sealing structure 548 comprises an elastomeric or rubber-like gasket. In another implementation, the sealing structure 548 comprises an elastomer material or an adhesive. In one implementation, as shown by broken lines, the entirety of upper surface 544 is provided with sealing structure 548. In yet another implementation, sealing structure 548 may comprise a ring or other structure encircling the perimeter of bore 528. In yet other implementations, the opposing and abutting surfaces of plate 524 and sheet 526 may be joined in other fashions to one another to provide a liquid-tight seal about well 626. For example, the opposing and abutting surfaces of plate 524 and sheet 526 may alternatively be joined by welding, fusing, bonding or the like to provide a liquid tight seal about well 626. In yet other implementations, sealing structure 548 may alternatively be provided on the lower surface of plate 524 about bore 528 or may be provided as a separate layer sandwiched between plate 524 and sheet 526 about well 528.

Figure 8:
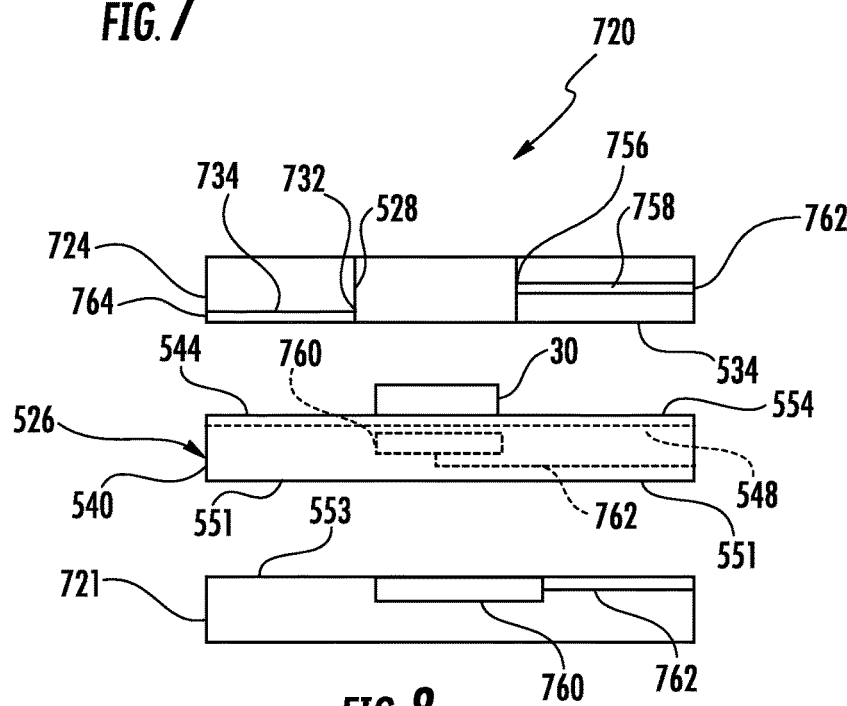
FIG. 8 is an exploded schematic diagram of an example SERS sample carrier.
Figure 9:
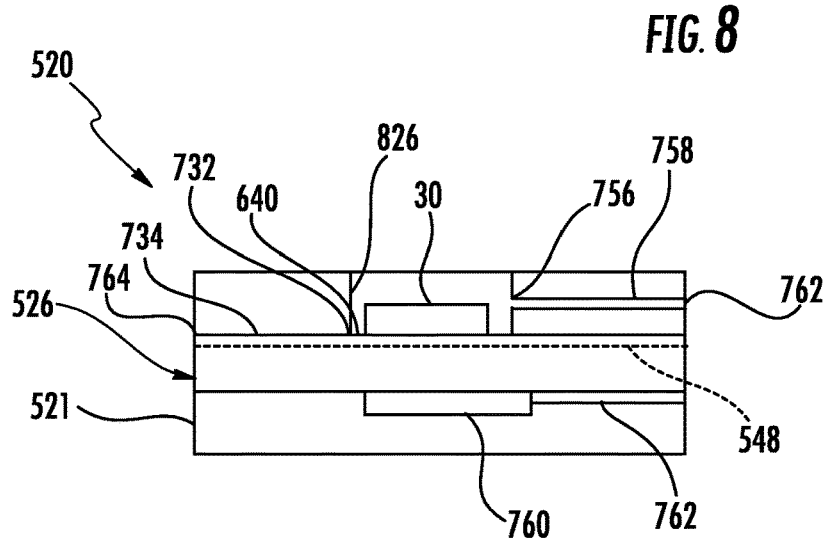
FIG. 9 is a schematic diagram of the SERS sample carrier of FIG. 8.

FIGS. 8 and 9 schematically illustrate an example SERS sample carrier 720 that may be used when analyzing a sample analyte using surface enhanced RAMAN spectroscopy. FIG. 8 is an exploded sectional view of sample carrier 720 while FIG. 9 illustrates the assembled sample carrier 720. In the example illustrated, carrier 720 may be utilized as part of system 400 described above. Carrier 720 comprises bottom support 721, well plate 724, and SERS sheet 526 (described above).

Bottom support 721 is similar to bottom support 521 described above except that bottom support 721 additionally comprises heater 760 and electrical line 762. Heater 760 comprises a heating device formed along upper surface 553 of support 721 so as to emit heat which is conducted across SERS sheet 526 to heat the contents of well 826 to accelerate drying of remaining renting solvent within well 826. In one implementation, heater 760 comprises an electrically resistive heater receives electrical power via electrical line 762 which is to be connected to an external electric power source, such as when carrier 720 is plugged into system 400. In such an implementation, controller 470 may output control signals resulting in electric current being supplied across electrically resistive material of heater 760 to generate and emit heat for heating the contents of well 826. In other implementations, heater 760 and electrically conductive line 762 may be omitted.

Well plate 724 is similar to well plate 524 described above except that well plate 724 additionally comprises pneumatic port 732, pneumatic passage 734, dispense port 756 and dispense passage 758. Pneumatic port 732 comprises an opening in or along the sides of well 826 through which liquid may be withdrawn from the interior of each of wells 26. In the example illustrated, pneumatic port 732 is located at or adjacent the floor of each of wells 826 to facilitate more complete removal of liquid from well 826. In one implementation, pneumatic port 732 is spaced no greater than 1 mm from the floor of each of wells 826. Pneumatic ports 732 are each connected to pneumatic passage 834.

Pneumatic passage 734 comprises a liquid flow passage in connection with pneumatic port 732 of carrier 720. Pneumatic passage 732 extends to an exterior port 764 at which pneumatic passage 734 may be connected to a pneumatic pump which may serve as a pneumatic source for applying a pneumatic to the passage 734 into the interior of well 826 so as to withdraw liquid within well 826 through passage 734. In one implementation, pneumatic passage 734 is completely surrounded by well plate 724. In another implementation, pneumatic passage 734 has a top and sides formed by well plate 724, wherein the floor or bottom of pneumatic passage 734 is provided by the upper surface of SERS sheet 526.

Delivery port 756 comprises an opening in or along the side of wells 826 through which liquid may be dispensed or delivered into the interior of well 826. In the example illustrated, delivery port 756 is located above a top of SERS structure 30 such that SERS structure 30 may be submersed within liquid dispensed through delivery port 756. In one implementation, delivery port 756 is located at or adjacent the mouth or top of well 826. In one implementation, delivery port 756 is spaced at least 1 mm above a top of SERS structure 30. Delivery port 756 is connected to delivery passage 758.

Delivery passage 758 comprises a liquid flow passage in connection with delivery port 756 of carrier 720. Delivery passage 758 extends within and through well plate 724 to an exterior inlet port 762 at which delivery passage 758 may be connected to a liquid supply which may serve to selectively supply a liquid, such as an analyte and/or a rinsing solvent to the passage 758 and into the interior of well 826 so as to supply well 826 with the analyte and/or rinsing solvent through passage 758. In some implementations, port 756 and passage 758 may be omitted.

SERS plate 526 is described above. In other implementations, such as where bottom plate 721 omits heater 760 and electrical line 762, SERS sheet 526 may alternatively comprise heater 760 and electrical line 762. In such an implementation, as indicated by broken lines in FIG. 8, heater 760 is embedded within sheet 526 or formed below SERS structure 30 in a location so as to underlie bore 528 and the formed well 826. In one implementation, heater 760 comprises an electrical resistor that emits heat in response to applied electrical current. Electrically conductive line 762 extends from heater 760 to an electrically conductive external contact pad to facilitate electrical connection to an external electrical power source such as when carrier 720 is plugged into the system, such as system 400 described above. In such an implementation, controller 470 may output control signals resulting in electric current being supplied across electrically resistive material of heater 760 to generate and emit heat for heating the contents of well 826.

As shown by FIG. 9, when bottom support 721, well support 724 and SERS sheet 526 are assembled, sheet 526 is sandwiched between bottom support 721 and well plate 724 with upper surface 544 fixedly secured to surface 534 of well plate 524 and with lower surface 551 of SERS sheet 526 fixedly secured to upper surface 553 of bottom support 521. The securement of SERS sheet 526 to bottom support 721 and well plate 724 may be provided by adhesives, welds, bonds, fasteners or other connection technologies. Well support 724 and SERS sheet 526 cooperate to form well 826, wherein sides 530 of bore 528 form the sides of wells 826 and wherein those portions of upper surface 544 of SERS sheet 526 about bore 528 form the floor 640 of wells 626. As further shown by FIG. 9, the island of SERS structure 30 projects into and is received within bore 528 so as to extend along the bottom of 826.

Portions of bottom surface 534 of well plate 724 about bore 528 are sealed against opposing portions of upper surface 544 of SERS plate 526. As indicated by broken lines, in one implementation, the upper surface 544 of SERS plate 526 comprises sealing structure 548 to provide a liquid tight seal between abutting portions of plate 724 and sheet 526 about well 826. In one implementation, the sealing structure 548 comprises an elastomeric or rubber-like gasket. In another implementation, the sealing structure 548 comprises an elastomer material or an adhesive. In one implementation, as shown by broken lines, the entirety of upper surface 544 is provided with sealing structure 548. In yet another implementation, sealing structure 548 may comprise a ring or other structure encircling the perimeter of bore 528. In yet other implementations, the opposing and abutting surfaces of plate 724 and sheet 526 may be joined in other fashions to one another to provide a liquid-tight seal about well 826. For example, the opposing and abutting surfaces of plate 724 and sheet 526 may alternatively be joined by welding, fusing, bonding or the like to provide a liquid tight seal about well 826. In yet other implementations, sealing structure 548 may alternatively be provided on the lower surface of plate 724 about bore 528 or may be provided as a separate layer sandwiched between plate 724 and sheet 526 about well 826.

Figure 10:
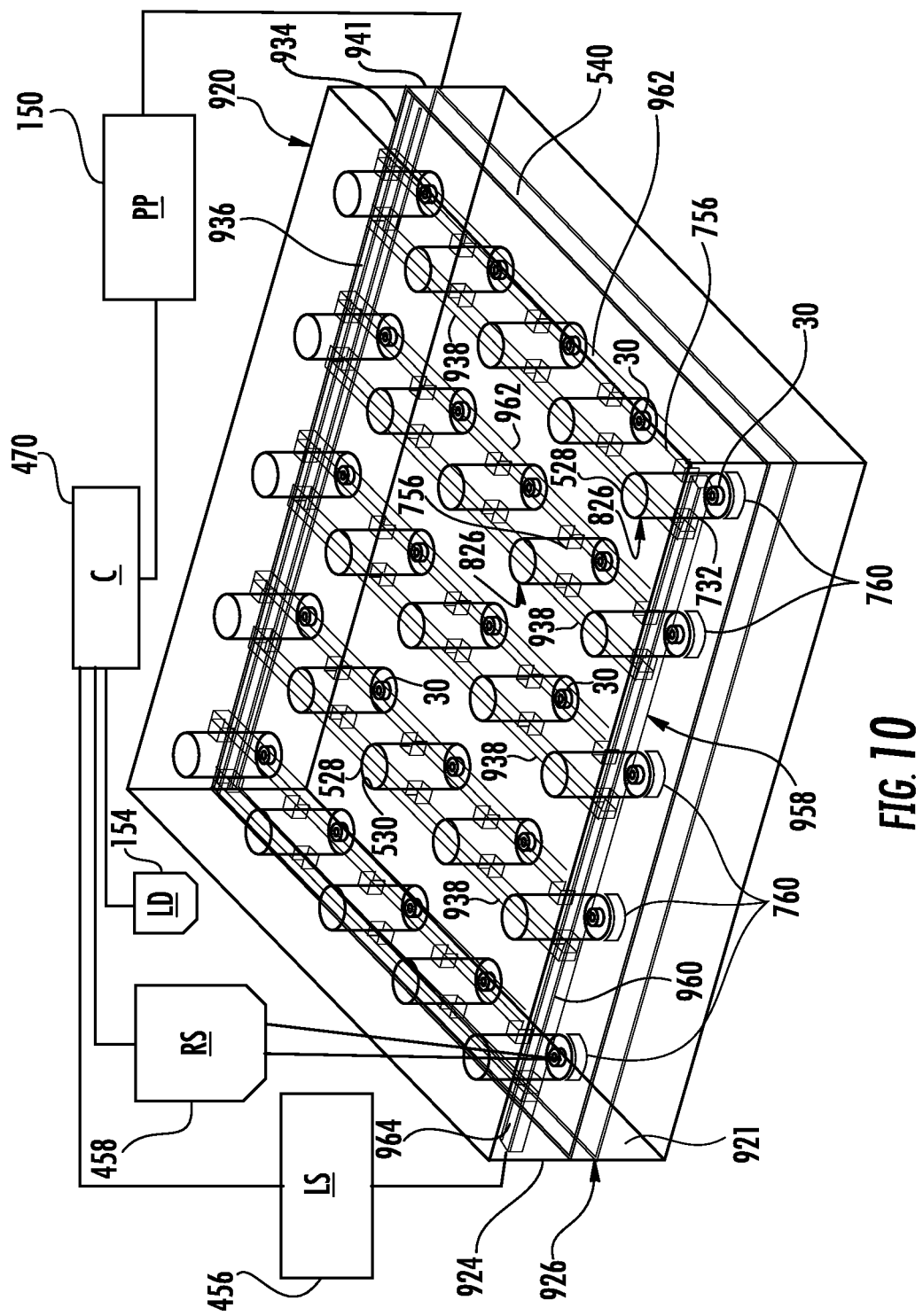
FIG. 10 is a top perspective view of an example SERS sample preparation and sensing system including an example SERS sample carrier.

FIG. 10 illustrates an example sample carrier 920, an example implementation of sample carrier 720, utilized as part of sample preparation and sensing system 400 (described above). System 400 utilizes carrier 920 in preparing multiple analyte samples in parallel. In the example illustrated, carrier 920 is releasably or removably connected to the remaining components of system 400 so as to serve as a replaceable or interchangeable consumable or modular component for system 400. Sample carrier 920 is similar to sample carrier 720 except that sample carrier 920 is specifically illustrated as comprising a two dimensional array or grid of wells arranged in five rows and associated components. Carrier 920 comprises bottom support 921, well plate 924 and SERS sheet 926.

Bottom support 921 is similar to bottom support 521 described above except that bottom support 921 comprises a two dimensional array or grid of heaters 760 (the first heater 760 in each row is illustrated for ease of illustration). The location of each of heaters 760 is aligned with and corresponds to one of the wells 826 formed by well plate 924 and SERS sheet 926. Each of the heaters 760 is connected to electrical line 762 (schematically shown in FIG. 9) extending to an electrical contact pad allowing the heaters to receive electrical current from an external power source under the control of controller 470. As described above, in some implementations, heater 760 may alternatively formed as part of SERS sheet 926.

Well plate 924 is similar to well plate 724 described above except that well plate 924 comprises a two dimensional array of bores 528 (described above) with each bore 528 having an associated pneumatic port 732 and a dispense port 756 (described above). Well plate 924 further comprises pneumatic passage 934 and dispense passage 958.

Pneumatic passage 934 is similar to pneumatic passage 734 described above except that pneumatic passage 934 comprises a main portion 936 and branches 938. Main portion 936 is connected each of branches 938 and terminates along an exterior of carrier 920 at an exterior port 941 releasably connected to pneumatic pump 150. Branches 938 extend from main portion 936 along each of the rows of wells 826, wherein each branch 938 is connected to the pneumatic ports 732 of each of the wells 826 of the associated row.

Dispense passage 958 is similar to dispense passage 758 except that dispense passage 958 comprises a main portion 960 and branches 962. Main portion 960 is connected each of branches 962 and terminates along an exterior of carrier 920 at an exterior port 964 releasably connected to liquid source 456. Branches 962 extend from main portion 960 and extend along each of the rows of wells 826, wherein each branch 960 is connected to the delivery port 756 of each of the wells 826 of the associated row.

SERS sheet 926 is similar to SERS sheet 526 described above except that sheet 926 comprises a two dimensional array of spaced islands of SERS structures 30 supported by substrate 540. In the example illustrated, substrate 540 supports five rows of spaced islands of SERS structures 30 which are located and sized to align with and be received within corresponding wells 528 of well plate 924 when carrier 920 is assembled. Because sheet 926 forms the floor of each of wells 826, the forming of well plate 924 may be facilitated in that well plate 924 includes bores that completely extend through well plate 924. Because sheet 926 is rigidified by bottom plate 921, sheet 926 may be formed from a flexible material, having a reduced thickness to facilitate roll-to roll manufacture of sheet 926 and to facilitate the concurrent forming of multiple islands of SERS upon substrate 540. In one implementation, substrate 540 of sheet 926 is formed from a material such as polyethylene terephthalate and has a thickness of less than or equal to 0.1 mm. In other implementations, substrate 540 of sheet 926 may be formed from other materials and may have other thicknesses.

Although SERS sample carrier 920 is illustrated as comprising five rows of wells 826 with each row comprising five individual spaced wells 826, in other implementations, carrier 920 may include a greater or fewer of such rows as well as a greater or fewer of wells 826 within each row. Although arranged in a two dimensional grid, wells 826 may have other arrangements on carrier 920. Although illustrated as being generally cylindrical, wells 826 may have other cross-sectional shapes. Although illustrated as being rectangular, carrier 920 may have other shapes.

FIGS. 11-16 are sectional views illustrating a portion of carrier 920 being utilized as part of system 400 described above. As illustrated by FIG. 11, controller 470 (shown in FIG. 10) outputs control signals causing pneumatic pump 150 to pressurize pneumatic passage 934 to inhibit entry of liquid from the wells 826 into passage 934. While pneumatic passage 934 is pressurized, controller 470 outputs signals directing robot 462 and liquid dispenser 154 to dispense sample of analyte 1000 into each of wells 826 so as to submerse each SERS structure 30. The dispensed sample of analyte 1000 submersing each SERS structure 30 is allowed to incubate for a predetermined period of time.

As illustrated by FIG. 12, after incubation, controller 470 outputs control signals to pneumatic pump 150 to create a vacuum within pneumatic passage 934, withdrawing, by vacuum, the samples of analyte 1000 from each of wells 826 through ports 732, leaving the incubated analyte 1000 on the SERS structures 30. As illustrated by FIG. 13, controller 470 outputs control signals to pneumatic pump 150 to once again pressurize pneumatic passage 936 to inhibit entry of liquid from the wells 826 into passage 934. While pneumatic passage 936 is being pressurized, controller 470 outputs control signals causing liquid supply for 562 dispense rinsing solvent 1002, such as ethanol (EtOH) into each of wells 826 through dispense passage 958 and through the side ports 756. In the example illustrated, the rinsing solvent submerses each of SERS structures 30.

As illustrated by FIG. 14, after nano fingers of SCR structure 30 have closed in response to the application of the rinsing solvent 1002, controller 470 outputs control signals to pneumatic pump 150 to apply a negative pressure to pneumatic passage 934 to vacuum and withdraw the rinsing solvent 1002 through passage 934. As illustrated by FIG. 15, to further evaporate any remaining rinsing solvent within each of wells 826, controller 470 further outputs control signals to supply electrical current to heaters 760 which emit heat to each of wells 826. In the example illustrated, controller 470 additionally outputs control signals directing a fan 1004 above carrier 920 to direct a gas, such as air, into each of wells 826 to further facilitate evaporation of any remaining rinsing solvent 1002. In some implementations, the air provided by fan 1004 is heated. In some implementations, controller 470 additionally or alternatively outputs control signals further directing pneumatic pump 150 to supply air into each of wells 860 through passage 934 to further assist in evaporation of any remaining rinsing solvent 1002. In yet other implementations, the remaining solvent within each well is permitted to dry without any assistance, naturally evaporating.

After evaporation of the rinsing solvent, both the sample analyte 1000 and the SERS structures 30 are ready for sensing and analysis. As illustrated by FIG. 16, controller 470 outputs control signals causing robot 462 (shown in FIG. 5) to sequentially position Raman sensor 458 opposite each of wells 826 and two obtain SERS spectra from each SERS structure 30 within each well 826 for analysis.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparatus comprising:
a sample carrier comprising:
wells formed inside a well plate of the sample carrier, wherein an interior of each of the wells includes side walls and a floor, the side walls and the floor being in contact with each other;
surface enhanced Raman spectroscopy (SERS) structures, wherein each of the SERS structures is located within the interior of one of the wells;
pneumatic ports connected to the wells, wherein each of the pneumatic ports comprises an opening connected to the interior of one of the wells; and
a pneumatic passage connected to all of the pneumatic ports, wherein one end of the pneumatic passage is a port to be connected to a pneumatic pump.

2. The apparatus of claim 1, wherein the sample carrier further comprises delivery ports, each of the delivery ports connected to the interior of one of the wells.

3. The apparatus of claim 2, further comprising: a solvent pump connected to the delivery ports.

4. The apparatus of claim 2, wherein the sample carrier further comprises heaters extending below the wells.

5. The apparatus of claim 1, wherein each of the pneumatic ports includes a valve to close and open the opening of the pneumatic port.

6. The apparatus of claim 1, wherein the sample carrier comprises:
a bottom support layer;
the well plate containing bores that provide the side walls of the wells and containing the pneumatic passage; and
a sheet having the SERS structures on a surface of the sheet, the sheet being sandwiched between the bottom support layer and the well plate such that each of the SERS structures is located inside one of the bores of the well plate.

7. The apparatus of claim 6, wherein the sample carrier further comprises delivery ports extending in the well plate, each of the delivery ports connected to the interior of one of the wells.

8. The apparatus of claim 6, wherein the sample carrier further comprises heaters, each of the heaters supported by the bottom support layer and extending below one of the wells.

9. The apparatus of claim 1, further comprising a robotic dispenser to dispense an analyte in each of the wells.

10. A method comprising:
dispensing an analyte into each of a plurality of wells of a sample carrier, each of the wells containing a surface enhanced Raman spectroscopy (SERS) structure within an interior of the well;
after incubating the analyte on the SERS structure in each of the wells for a predefined period of time, withdrawing the analyte from each of the wells via an opening on a side wall of the well;
after withdrawing the analyte from each of the wells, dispensing a rinsing solvent in each of the wells;
withdrawing the rinsing solvent from each of the wells; and
drying a remaining of the rinsing solvent within each of the wells.

11. The method of claim 10, wherein the drying of the remaining of the rinsing solvent within each of the wells comprises increasing a flow of gas through each of the wells through a gas port in each of the wells.

12. The method of claim 10, wherein the drying of the remaining of the rinsing solvent within each of the wells comprises applying heat to each of the wells from a heater below each of the wells.

13. The method of claim 10, wherein the dispensing of the rinsing solvent in each of the wells is through a fluid delivery port in each of the wells.

14. A sample carrier comprising:
a bottom support layer;
a well plate having a plurality of bores; and
a sheet including surface enhanced Raman spectroscopy (SERS) structures on a surface of the sheet, the sheet being sandwiched between the bottom support layer and the well plate, the bottom support layer and the well plate being in contact with each other, and each of the SERS structures on the surface of the sheet being located inside one of the bores of the well plate, wherein wells are formed by the bores of the well plate and the surface of the sheet, and each of the wells contains one of the SERS structures within an interior of the well;
pneumatic ports formed in the well plate, wherein each of the pneumatic ports comprises an opening connected to the interior of one of the wells; and
a pneumatic passage formed in the well plate and connected to all of the pneumatic ports.

\* \* \* \* \*